United States Patent [19]

Boharski

[11] Patent Number: 4,819,361
[45] Date of Patent: Apr. 11, 1989

[54] FISHING LURE

[76] Inventor: Robert Boharski, 7914 W. 92nd St., Hickory Hills, Ill. 60437

[21] Appl. No.: 916,020

[22] Filed: Oct. 6, 1986

[51] Int. Cl.⁴ .............................................. A01K 85/00
[52] U.S. Cl. ..................................................... 43/17.6
[58] Field of Search ......................................... 43/17.6

[56] References Cited

U.S. PATENT DOCUMENTS

| 2,550,988 | 5/1951 | Flournoy | 43/17.6 |
| 2,862,325 | 12/1958 | Magnus | 43/42.39 X |
| 4,060,926 | 12/1977 | Cordell, Jr. | 43/42.44 |
| 4,114,305 | 9/1978 | Wohlert et al. | 43/17.6 |
| 4,250,650 | 2/1981 | Fima | 43/17.6 |
| 4,426,803 | 1/1984 | Helling | 43/17.6 |

FOREIGN PATENT DOCUMENTS

| 2535433 | 2/1977 | Fed. Rep. of Germany | 43/17.6 |
| 612106 | 10/1926 | France . | |
| 355593 | 8/1931 | United Kingdom . | |

*Primary Examiner*—Nicholas P. Godici
*Assistant Examiner*—Carmine Cuda
*Attorney, Agent, or Firm*—Paul H. Gallagher

[57] ABSTRACT

The lure includes a body including therein a generator, and an electric light exposed to the exterior. The generator is driven by a propeller actuated by drawing in the lure, through the water after casting. In one form the generator is rotary, and in another it is reciprocatory. The light may be alternatively an incandescent light or an LED with fiber optics exposed to the exterior.

10 Claims, 1 Drawing Sheet

U.S. Patent　　　Apr. 11, 1989　　　4,819,361
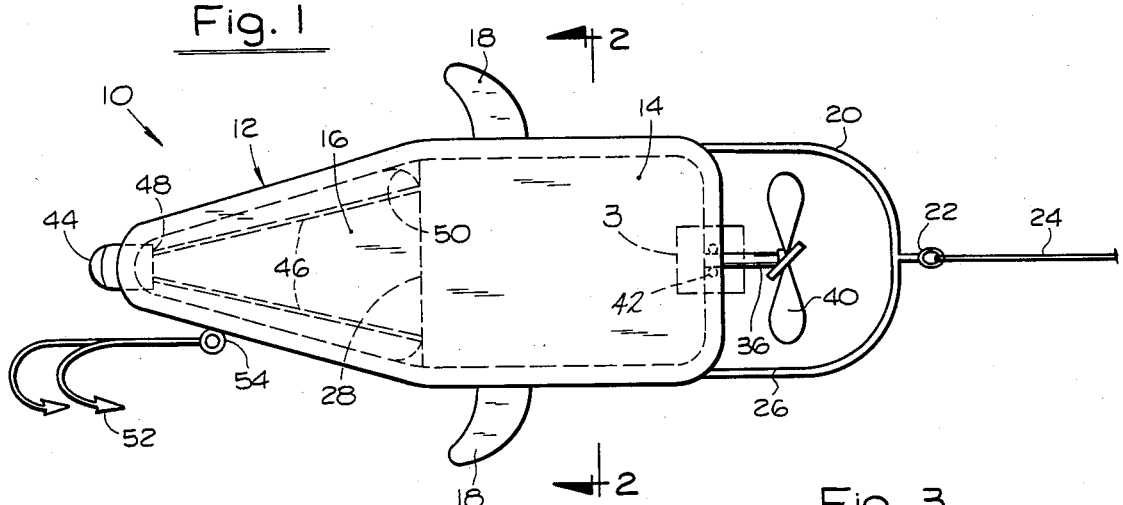
Fig. 1
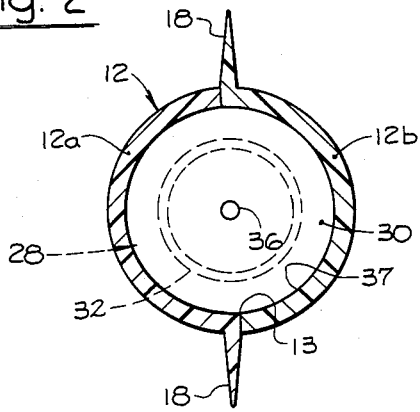
Fig. 2
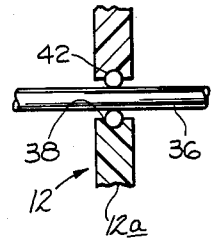
Fig. 3
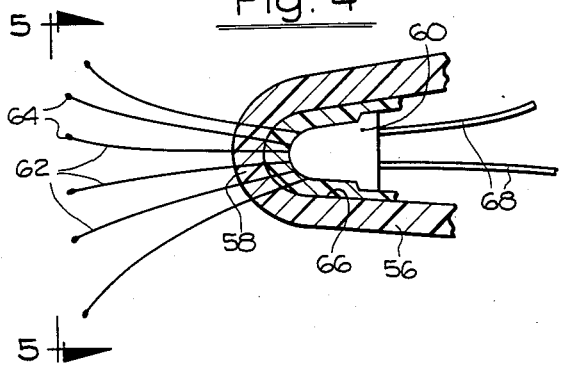
Fig. 4
Fig. 5
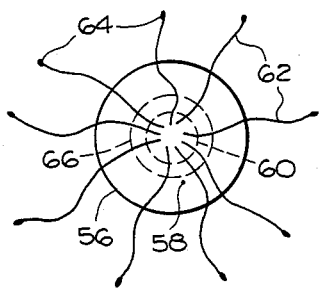
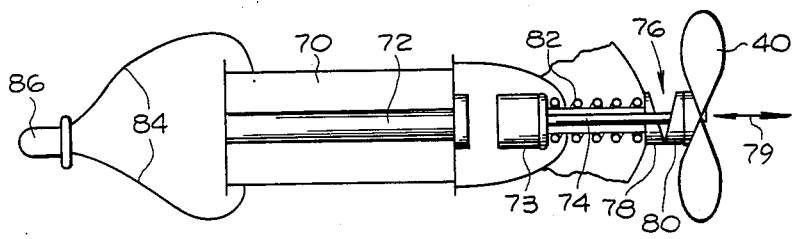
Fig. 6　　　Fig. 7

FISHING LURE

FIELD OF THE INVENTION

The invention resides in the field of fishing lures of the type that is cast into the water, and then drawn in, and an unusual effect is produced by the drawing in action, to attract the fish.

OBJECTS OF THE INVENTION

A broad object of the invention is to produce a novel fishing lure having the following features and advantages:

1. A light is produced in the lure, in response to the lure being drawn along the water, for attracting the fish.
2. The lure includes a generator and a propeller running the generator that is driven by its movement through the water.
3. A great variety of designs and configurations of lights, and lighting effects, can be produced.

DESCRIPTION OF A PREFERRED EMBODIMENT

In the drawings,

FIG. 1 is an elevational view of the fishing lure of the invention;

FIG. 2 is a sectional view taken at line 2—2 of FIG. 1;

FIG. 3 is a sectional view of the portion surrounded by the rectangle 3 in FIG. 1 and oriented according to FIG. 1;

FIG. 4 is a sectional view of the trailing end of a lure, showing a modified form;

FIG. 5 is an end view taken at line 5—5 of FIG. 4;

FIG. 6 is a diagrammatic view of a modified form of lighting component for use in the lure.

FIG. 7 is a view similar to FIG. 6 showing certain elements in different positions.

Referring in detail to the device of the invention, attention is directed first to FIG. 1 showing the fishing lure in its entirety, in external view, and to FIG. 2 showing a cross sectional view. The fishing lure is indicated in its entirety at 10 and includes a body 12, preferably made up of halves 12a and 12b fitted together, the parting plane being indicated at 13; the halves are identical, or substantially so. The body is in the form of a shell, and may be made of various materials, preferably of plastic, molded to shape, and secured together in a suitable and known manner, in which the halves become unitary, and virtually integral, the process herein being referred to as fused. The body includes a front portion 14 which may be generally cylindrical in shape, and a rear portion 16 tapering rearwardly, in a general streamline shape. Fins 18 are provided and these may be integral with respective ones of the shell halves 12a, 12b. The fins 18 stabilize the lure, as the lure is drawn in, through the water, against rotation about its longitudinal axis.

A bail 20 is provided for securement of a line 24 thereto at eye 22, the bail being U-shaped and secured directly to the body of the lure, such as by positioning the legs 26 between the halves, at the parting line 13 in fusing the halves together.

Mounted in the body 12 is a generator 28, of known kind. This generator is indicated diagrammatically in FIG. 2 and includes an outer field 30, and a rotatable armature 32 on a shaft 36, the parts preferably being dimensioned so that the generator fits snugly to the inner surface of the body, as indicated at 37. The generator is in the form of a device known and on the market, and commonly used as a motor, but used herein as a generator. The shaft 36 extends to the exterior through an opening 38 in the body and sealed therein by an O ring 42. Mounted on the outer end of the shaft is a propeller 40. At the trailing end of the body is a light, light bulb, or lamp 44, a pair of electrical conductors 46 operably interconnecting the generator 28 and the light in a known manner.

In FIG. 1, the light 44 may be an ordinary incandescent lamp having a localized lighted spot, and is mounted in the body with the lighted end exposed to the exterior. The light may be mounted in any suitable manner, such as by positioning it between the halves of the body when the latter are fused together, and it may be additionally secured in place by a suitable cement at the location 48 in a suitable manner. Also the generator 28 may be additionally secured in position by cement at the location indicated at 50.

A fish hook 52 is secured at 54 to the body adjacent the trailing end of the latter.

In the use of the lure, the fisherman throws the lure into the water and draws it in. In the movement of the lure through the water, the propeller 40 is driven and it actuates the generator and lights the light 44. The device is capable of producing a very brilliant effective light, by the action of the propeller. The density of the water provides great force and is very effective for driving the propeller. The brilliant light creates great attraction to the fish.

Instead of the incandescent light 44, a different form may be utilized, as represented in FIGS. 4 and 5. In these figures, the body 56 is similar to the body 12 except that it has a generally closed trailing end 58. In this arrangement an LED 60 is embedded or molded in the body, and a plurality of fiber optics 62 are operably connected with the LED and lead through the body to the exterior where their trailing ends 64 provide lighting effects individually. The fiber optics 62 may be embedded or molded in the material of the body, and the LED may be additionally secured in place by a suitable cement at 66. Conductors 68 lead from the LED to the generator.

The fiber optics 62, as is known, provide a lighting effect at their outer ends, and not laterally throughout their length. Preferably a relatively great number of these elements are provided and they may be spread in a pattern extending throughout an area transverse to the lure, i.e. transverse to its direction of movement. This provides a very striking effect, and produces a great attraction to the fish.

Instead of the rotary generator 28 utilized above, the invention is of sufficient scope to cover other kinds of generators. FIG. 6 shows an alternative kind of generator, which includes a field 70 and an armature 72 fixed therein. A permanent magnet 73 is mounted on a shaft 74, and a drive transmitting component 76 is operably interposed between the propeller 40 and the shaft, for converting rotary motion to reciprocal motion, the latter motion being indicated by double headed arrow 79. The component 76 may include interacting cam elements 78, 80, on the body and shaft respectively. Upon rotation of the shaft, the cam elements force the shaft 74 outwardly and a compression spring 82 returns it inwardly, thereby moving the permanent magnet 73 from and toward the armature 72 respectively. Conductors 84 are connected between the generator and an LED 86 and the complete unit illustrated in FIG. 6 is mounted in a lure body.

The reciprocating motion of the shaft 74, toward and from the armature/field, produces a pulsating light, of bright/dim, or on/off character. This pulsating effect also produces a very unusual attraction to the fish.

I claim:

1. A fishing lure of the kind adapted for connection to a line, and cast into the water, and drawn in, and having a leading end and a trailing end relative to the direction of drawing in, comprising, a body including a shell made up of a pair of substantially identical halves fused together, an electric light mounted in the shell, with the major portion of the light confined between the shell halves and being exposed to the exterior at the rear, an electrical generator confined in the shell halves and operably connected to the light, and having an operating shaft exposed through the front of the shell to the exterior, and a propeller mounted on the shaft, on the exterior of the shell, and operably in response to drawing the lure through the water for operating the generator and a boil mounted to the leading end of the body and extending around said propeller with a forward end for attachment to said line.

2. A fishing line according to claim 1 wherein, the generator includes a rotatable armature, and the lure includes means operably interconnecting the propeller and the armature for rotating the armature.

3. A fishing lure according to claim 1 wherein, the generator includes a reciprocating magnet, and the lure includes means operably interconnecting the propeller and the magnet.

4. A fishing lure according to claim 1 wherein, the generator produces a constant light.

5. A fishing lure according to claim 1 wherein, the generator produces a pulsating light.

6. A fishing lure according to claim 1 wherein, the generator produces an interrupted light.

7. A fishing lure according to claim 1 wherein, the light includes an LED.

8. A fishing lure according to claim 7 wherein, the light includes fiber optics operably connected to the LED having inner ends operably connected with the LED and outer ends exterior to the body of the lure that are effectively lighted.

9. A fishing lure according to claim 8 and including, a plurality of said fiber optics so arranged that their outer ends are distributed in an area transverse to the lure and present a pattern of light spots when viewed longitudinally.

10. A fishing lure according to claim 1 wherein, the body includes fins for stabilizing the lure against rotation about the axis of the drawing-in direction.

* * * * *